INVENTOR.
Keiji Okaniwa
Isao Takatama
Shigeru Maehara
Isoji Igarashi

INVENTOR.
Keiji Okaniwa
Isao Takatama
Shigeru Maehara
Isoji Igarashi

United States Patent Office 3,118,759
Patented Jan. 21, 1964

3,118,759
METHOD FOR RECOVERING WASTE GAS FROM OXYGEN TOP BLOWING CONVERTER IN UN-BURNED STATE
Keiji Okaniwa and Isao Takatama, Tsurumi-ku, Yokohama City, and Shigeru Maehara and Isoji Igarashi, Yawata City, Japan, assignors to Yawata Iron & Steel Co., Ltd., and Yokoyama Engineering Co., Ltd., Tokyo, Japan
Filed Apr. 5, 1962, Ser. No. 185,447
Claims priority, application Japan May 19, 1961
3 Claims. (Cl. 75—60)

The present invention relates to method for recovering waste gas from an oxygen top blowing converter in an unburned state.

The waste gas discharged from an oxygen top blowing converter has a temperature as high as 1430° C. when it is discharged from the converter and moreover where a large capacity converter is used the waste gas discharged during the peak of blowing contains as much as from 80 to 90% of CO which is very valuable for use in the chemical industry.

For utilizing the sensible and latent heat of this waste gas, a so-called converter waste heat boiler has been widely used in an attempt to reduce the production cost of steel by using the waste heat as a subsidiary heat source. However, a boiler of this type has several disadvantages as enumerated below:

(1) Since the operation of converter is an intermittent one in the cycles lasting scores of minutes each, it it necessary, when the blowing of the converter is not taking place, to make up for the absence of heat by supplementary firing of oil or other fuel in order to get constantly from the waste heat boiler a given amount of vapour. Consequently, the operation of the waste heat boiler becomes more complicated.

(2) The immense amount of waste gas discharged is further increased in its volume due to its high temperature and further because the waste gas requires, when it burns, an average of 2.5 times its volume of air, so that the total volume of the gas to be handled in the boiler can amount to as much as about six times the volume of the waste gas actually discharged from the converter. Accordingly, the waste heat boiler must be of very large capacity and have a much higher construction cost making redemption of the initial cost more difficult.

(3) In the waste gas immediately after it is discharged from the converter, there is a large amount of dust which is mostly iron oxide in composition afloat in the mixture which is discharged with the waste gas, which dust in the presence of firing heat and surplus oxygen in the boiler further oxidizes to give red colored dust (ferric oxide $Fe_2O_3$ particle diameter max. 1 micron) which causes considerable trouble during dust separation.

The aforesaid drawbacks are inherent ones in the waste heat boilers of the conventional type and in order to overcome these drawbacks all at once it will be appreciated that the best way is to clean and collect the waste gas in an unburned state and burn it in a smaller boiler at a steady rate. Moreover, as the waste gas is highly valuable as raw material for use in the chemical industry, the value of recovering the waste gas safely and surely in an unburned state for effective use as raw material will be appreciated. That is to say, in the method of recovering the waste gas in an unburned state the conventional large waste heat boiler becomes superfluous and is replaced by a gas cooling device which recovers only sensible heat and is comparatively small in size because the amount of heat absorbed is only about one sixth of the amount recovered by a conventional boiler. Moreover separation of dust is very easy, because the dust mixed in the waste gas is in the form of big particles of iron oxide ($FeO$, $Fe_3O_4$) more than 10 microns in diameter, because most of the waste gas is reducing and further the capacity of the dust collector can be made much smaller.

From the results of their experiments made in a pilot plant for recovering waste gas in the unburned state from a converter of 2 tons capacity, the inventors have succeeded in finding some absolutely safe and reliable methods to recover this explosive waste gas. And as one of the methods to recover the waste gas in an unburned state, the inventors proposed an air-tight apparatus to recover the waste gas from an oxygen top blowing converter as described in their copending U.S. Patent application Serial No. 171,031.

As has been well known, the waste gas discharged from a converter of large capacity is very useful containing in the peak stage of blowing as much as from 80 to 90% of CO which tends to increase rapidly from 0% in the initial stage of blowing and to drop suddenly down to 0% in the final stage. The oxygen content of the waste gas, on the contrary, rapidly drops from the maximum in the initial stage of blowing and increases rapidly from the minimum in the final stage. In the initial stage of the oxygen blowing, the decarburization reaction in the molten iron has not gotten started completely, and the waste gas has less CO content, and on the other hand since unreacted $O_2$ is discharged mixed with waste gas the percentage of $O_2$ content rate drops, and in the final stage of blowing the $O_2$ content increases because by that time the carbon in the molten iron has substantially completely reacted and consequently the amount of oxygen supplied for blowing remains in the waste gas as surplus. This oxygen content is liable, if it exceeds a certain limit, to cause a drastic reaction with CO in the waste gas and to touch off an explosion.

In the waste gas recovery method in which waste gas discharged from converter is first cooled in a cooling device and then freed from dust in a dust collector and this cleaned gas is drawn by an induced draft fan through a gas flow control valve and then stored in a gas holder, the key to successful practice of the method lies in the proper control of the pressure inside the cooling device by means of a gas flow control valve. If this gas flow control valve fails, for some reason or other, to work with good sensitivity the pressure inside of the cooling device will go out of control causing the waste gas to leak out and the open air to come into the system through the sheltered area between the mouth of converter and the bottom of the cooling device. CO, being a toxic gas, must not be allowed to leak out and the open air must not be introduced into the cooling device in an excessive amount because it is liable to become a cause of CO gas exposion.

However, as the operating sensitivity of the gas flow control valve will be blunted if the flow of the waste gas falls, it should be taken into consideration that in the initial and final stages of blowing inflow of some outside air is unavoidable.

As stated previously, the hazard of an exposion of CO gas is greatly influenced by the condition of the gaseous atmosphere in the recovery system. However, in the inventors' experiments in recovering waste gas from a 2 ton capacity converter there was also an experience in which the exposion actually occurred at a condition of the gaseous atmosphere where no hazard of explosion could be anticipated. Therefore, in working out a safe and reliable method for recovering waste gas from an oxygen top blowing converter, every precaution must be taken to eliminate any possible cause of the explosion.

The inventors succeeded in preventing an exposion of CO gas by adopting a method in which the waste gas in the cooling device in the initial and final stages of blowing is forcibly mixed with an inert gas, nitrogen for example, thereby diluting the waste gas and reducing its $O_2$ content below the range of CO explosion hazard and at the same time increasing the substantial flow of waste gas so that the gas flow control valve can work with good sensitivity in order to keep a proper control of the pressure inside of the cooling device. In the above method, using nitrogen for diluting the waste gas, the by-product nitrogen obtained from production of oxygen for blowing is utilized, but it is highly desirable to eliminate the use of nitrogen for diluting and thereby simplify the equipment and facilitate the operation of recovering waste gas.

In order to prevent an explosion of CO gas due to a high concentration of $O_2$ in the waste gas in the initial and final stages of blowing, the inventors have devised a method in which air is positively admitted into the waste gas in the initial and final stages of blowing for use in burning, which method is the method of this invention.

An object of this invention is to provide a method in which the pressure inside of the cooling device in the initial and final stages of blowing in the oxygen top blowing converter is regulated so as to be a negative pressure for drawing air into the cooling device to be mixed with the waste gas and the gas produced is burned and released, and in the peak stage of oxygen blowing the pressure inside of the cooling device is regulated so as to be a positive pressure and the waste gas produced is recovered in the unburned condition.

Another object of this invention is to provide a method in which the waste gas is recovered in the unburned state while isolating the waste gas from the open air by applying an inert gas between the mouth of converter and an adjustable skirt in the peak stage of oxygen blowing.

Still another object of this invention is to provide a method in which the waste gas is recovered in the unburned state while isolating the waste gas from open air by closely connecting the mouth of converter and the adjustable skirt during the aforesaid recovering period. These two methods can also be combined in order to obtain a better isolating effect.

For a better understanding of the present invention, reference may be made to the accompanying drawings in which.

Figure 1:
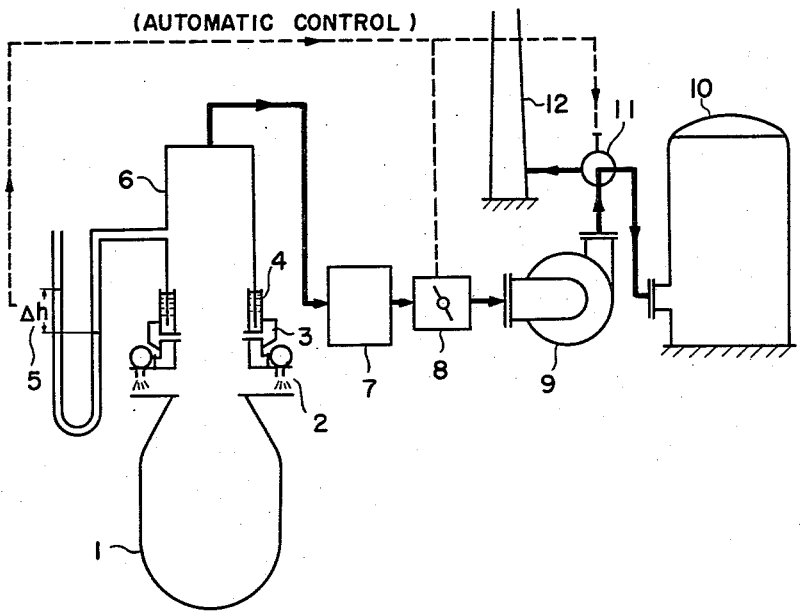
FIG. 1 is a flow-sheet of the apparatus for carrying out the method of the invention.
Figure 2:
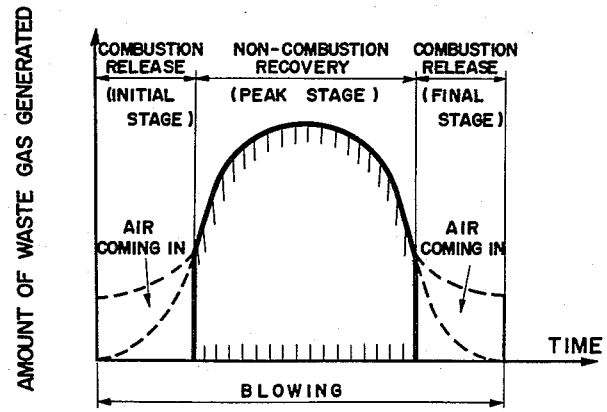
FIG. 2 is a graph showing the volume of waste gas generated and blowing time.

Referring more particularly to FIG. 1 which shows the equipment for recovering waste gas by the method of the present invention, a converter 1 has a gas cooling device 6 positioned above the mouth thereof, and between the bottom of the cooling device 6 and the mouth of the converter is a vertically adjustable skirt 4 in sealing relationship with the lower end of the cooling device 6, and having a main gas injection pipe 3 for injecting diluting gas into the cooling device, and a gas curtain forming means 2 for forming a curtain of inert gas around the mouth of the converter 1 to exclude the outside atmosphere. A differential pressure measuring means 5 is provided for the cooling device 6, which in the present embodiment measures the pressure differential in the cooling device in terms of a column of water. Connected to the cooling device downstream thereof is a dust collector 7, and downstream of the dust collector 7 is a gas flow control valve 8. Downstream of the valve 8 is an induced draft fan 9, to the discharge side of which is connected a three-way valve 11, one discharge side of which is connected to a gas holder 10 and the other discharge side of which is connected to the exhaust stack 12. The flow control valve 8, pressure differential measuring means 5 and the three-way valve 11 are coupled in an automatic control system.

In order to have the waste gas from the converter 1 received by the cooling device and isolated from contact with the open air, the vertically adjustable skirt 4 is provided and the skirt and the mouth of converter is sealed by the surrounding inert gas curtain, nitrogen for example. The joint between the cooling device and the skirt is a water seal and is so constructed that the distance between the mouth of converter and the opening of the skirt can be adjusted in accordance with the ability of the gas curtain to exclude outside air. If the curtain is highly effective, the opening can be widened by lifting the skirt and when the curtain is weak, the skirt can be lowered to narrow the opening. In the worst case where almost no isolating effect is expected from the curtain, the skirt may be lowered until it is in close contact with the mouth of converter.

The pressure inside of the cooling device 5 is expressed by $\Delta h$ and is coupled by the automatic control system to the flow control valve 8 and is usually adjusted by the flow control valve to remain at several mm. water column (positive pressure). The cleaned waste gas expelled from the induced draft fan 9 is, while it is low in CO concentration and poor in the use value in the initial and final stages of blowing, released into the open air from the releasing tower 12 through the three-way switch valve 11. And the valuable gas high in CO concentration produced during the peak stage of blowing is stored in the gas holder 10 by switching the three-way valve 11.

During the period when the waste gas is low in CO concentration in the initial stage of blowing, the distance between the converter and the cooling device is widened by lifting the skirt, and at the same time the supply of the inert gas to the curtain is stopped. Further, if the pressure inside the cooling device $\Delta h$ is regulated so as to be a negative pressure by the gas flow control valve 8, a larger amount of air comes into the cooling device through the opening between the skirt and the converter and contacts the waste gas. Therefore the CO in the gas burns readily at the entrance to the cooling device and no surplus CO remains to participate in an explosion. This burned gas is released into the air through the releasing tower 12.

Since, in the initial and final stages of blowing, the air is believed to be drawn into the cooling device in an amount somewhat in excess of the theoretical percentage of the air required for the combustion of CO in the waste gas issued from the converter during these periods, not only is the CO burned to eliminate it to a large extent but the added air makes up for the decline in the gas flow so that the gas flow control valve can maintain its sensitivity to ensure the proper regulation of pressure inside of the cooling device in just the same way nitrogen which is used for dilution makes up for the drop in gas volume, and the drastic change in the volume of the gas in the system is eliminated and the hazard of an explosion from such a drastic change can be prevented or kept to a minimum. When the blowing nears its peak and the waste gas discharged becomes higher in CO concentration adequate for use as raw material in the chemical industry, the skirt 4 is lowered close to the mouth of the converter to stop the inflow of air, the inert gas curtain 2 is formed so that the waste gas is isolated from the contact with the open air, and at the same time the inside pressure of the cooling device is regulated through the gas flow control valve 8 by switching the pressure inside the furnace of the cooling device from a negative pressure to a positive pressure of several mm. water. The waste gas obtained during this period is cleaned and stored in the gas holder 10. When the blowing proceeds further and the drop in the CO content of the waste gas diminishes its use value, the skirt is lifted to allow the air to come in to help combustion of the waste gas and the three-way switch valve is switched over to the release side and the burned waste gas is released into the open air.

In regard to the manner of determining the moment of switching from combustion and release of gas to non-combustion and recovery of gas, or vice versa, a curve showing the change in average CO content in the waste gas which does not vary appreciably from results in the practical operation of the system, is determined by plotting the change in CO content in the waste gas against blowing time and the proper points on the curve are used to program the automatic switching system for release and recover of the waste gas. In order to associate the programming control with the automatic switching system, a timer is used to perform the switching operation from release to recovery when a certain time lapses after the start of blowing and to switch from recovery to release after the recovery is carried out for a certain period of time.

It is clear that by the method of the present invention the same effect can be attained as when using nitrogen for dilution, but since no nitrogen is actually used the operation of the whole recovery system is simplified and is less expensive.

Further, by using the method of the present invention, it is not necessary to displace the air with nitrogen in order to prevent an explosion due to a drastic contact of air remaining in the recovery system before the start of the oxygen blowing with the waste gas discharged from the converter, or to displace the waste gas in the system with nitrogen in order to prevent an explosion due to drastic contact of air with the waste gas remaining in the recovery system after termination of blowing. Consequently, the cost of an immense amount of nitrogen used for purging can be saved, the operation of the recovery system can be simplified and moreover the time required for blowing can be shortened, resulting in an improvement in steel making efficiency and considerable reduction in the production cost per ton of steel.

Figure 3:
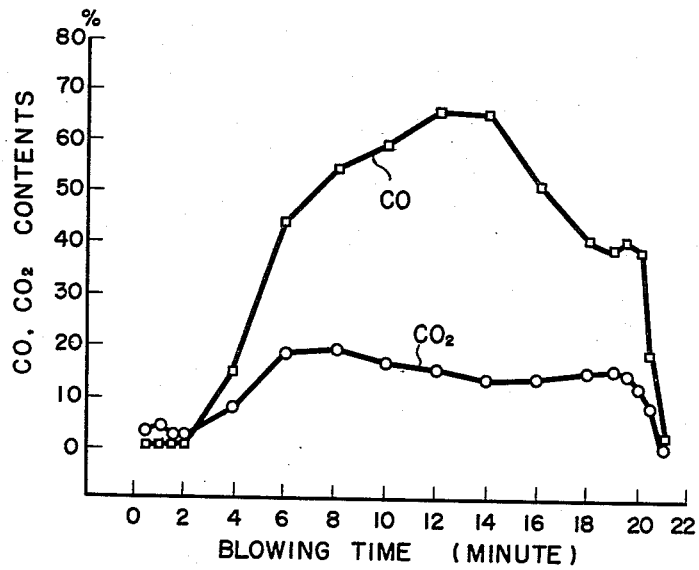
FIG. 3 is a graph showing the relation of CO and $CO_2$ in waste gas diluted with $N_2$ at various points during the blowing time.
Figure 4:
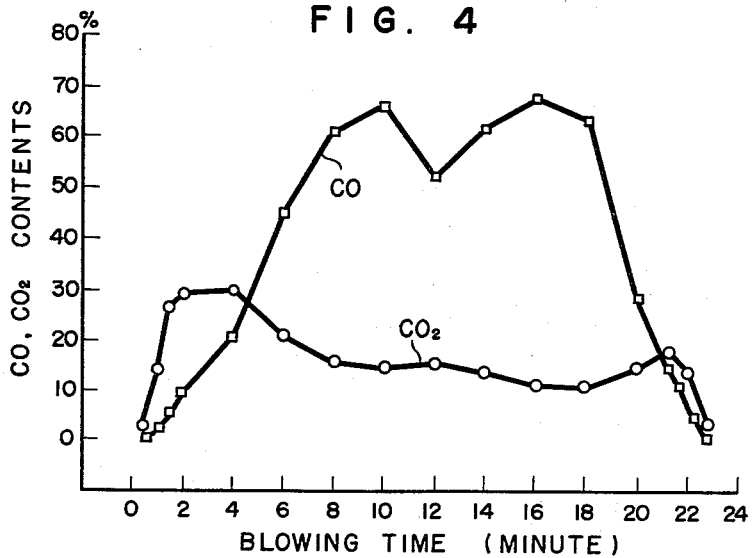
FIG. 4 is a graph showing the relation of CO and $CO_2$ in the waste gas which has been burned in the initial and final stages of blowing and the blowing time.

In the attached drawings, FIGS. 3 and 4 show the results of experiments made by the inventors using a pilot plant for recovering the waste gas discharged from a 2 ton converter. Particularly, FIG. 3 shows the change in waste gas content in an experiment where both purging with nitrogen and dilution by nitrogen were performed, and FIG. 4 shows the change in waste gas content in an experiment where the waste gas was subjected to a positive combustion in the initial and final stages of the blowing.

*Example*

| | |
|---|---|
| Molten iron used (wt.) | 2,030 kg. |
| Steel produced (wt.) | 1,960 kg. |
| Blowing time | 20 min. 40 sec. |
| Temperature of molten iron after blowing | 1,690° C. |
| Oxygen blowing pressure | 7 kg./cm.$^3$. |
| Amount of oxygen used | 116 m.$^3$. |

Composition of molten iron:

| | Percent |
|---|---|
| C | 4.09 |
| P | 0.26 |
| Si | 0.61 |
| S | 0.030 |
| Mn | 0.74 |

Composition of iron before charged into the converter:

| | Percent |
|---|---|
| C | 0.13 |
| P | 0.057 |
| Si | 0.01 |
| S | 0.01 |
| Mn | 0.32 |

After 4 minutes from the start of blowing:

| | |
|---|---|
| Temperature of the waste gas at the exit of the cooling device | 100° C. |
| Temperature of waste gas at the inlet to the induced draft fan | 17° C. |
| Inside pressure of the cooling device | −0 mm. water column. |
| Volume of waste gas | 590 Nm.$^3$/h. |

Composition of waste gas:

| | Percent |
|---|---|
| $CO_2$ | 29.5 |
| $N_2$ | 48.4 |
| $O_2$ | 1.5 |
| CO | 20.6 |

After 12 minutes from the start of blowing:

| | |
|---|---|
| Temperature of the waste gas at the exit of the cooling device | 350° C. |
| Temperature of waste gas at the inlet to the induced draft fan | 21° C. |
| Inside pressure of the cooling device | +1 mm. water column. |
| Volume of waste gas | 870 Nm.$^3$/h. |

Composition of waste gas:

| | Percent |
|---|---|
| $CO_2$ | 15.3 |
| $N_2$ | 31.8 |
| $O_2$ | 0.5 |
| CO | 52.4 |

After 20 minutes from the start of blowing:

| | |
|---|---|
| Temperature of the waste gas at the exit of waste gas cooling device | 450° C. |
| Temperature of waste gas at the inlet to the induced draft fan | 29° C. |
| Inside pressure of the cooling device | −0 mm. water column. |
| Volume of waste gas | 500 Nm.$^3$/h. |

Composition of waste gas:

| | Percent |
|---|---|
| $CO_2$ | 14.6 |
| $O_2$ | --- |
| CO | 23.8 |
| $N_2$ | 56.6 |

What we claim is:

1. A method for recovering unburned combustible waste gas produced by blowing pure oxygen into an oxygen top-blowing converter for refining a molten pig iron and collecting said waste gas by using a recovery system having a gas cooler positioned above the converter and an inert gas skirt forming means around said cooler and movable toward and away from said converter, and an induced draft fan and control valve coupled to said cooler, comprising the step of setting the control valve and running the induced draft simultaneously with the start of blowing oxygen onto the molten pig iron poured into said converter for keeping the pressure inside of said gas cooler at a negative pressure with respect to the atmosphere and lifting the movable skirt away from the converter for drawing outside air into said gas cooler through the widenend clearance between said skirt and the mouth of said converter, burning, the waste gas issuing from said converter with said outside air and discharging the products of combustion thus produced, the gaseous atmosphere in the gas recovering system thus being replaced by the products of combustion and thereby avoiding the danger of explosion of waste gas which may have collected in the system, then when the CO content of the waste gas issuing from the converter reaches a predetermined value, moving said skirt close to the mouth of converter and forming an inert gas curtain therearound while simultaneously adjusting the control valve to change the pressure inside of said gas cooler from a negative to a positive pressure, thus preventing outside air from being drawn into said gas cooler and isolating the waste gas issuing from the converter from the outside air, cleaning said waste gas and storing the cleaned waste gas in a gas holder, and when the CO content of the waste gas issuing from the converter again drops below the predetermined value, moving said skirt away from the converter while changing the control valve to reduce the pressure inside of said gas cooler from a positive to a negative pressure, thereby again drawing outside air into said gas cooler, burning the waste gas with the outside air and discharging the products of combustion into the outside atmosphere thereby replacing the gaseous atmosphere in the recovery system by said products of combustion and voiding the danger of an explosion.

2. A method claimed in claim 1, in which the amount of outside air drawn into the gas cooler is considerably in excess of the theoretical percentage of air required for the combustion of the CO contained in the waste gas produced during the periods when outside air is being drawn in, so that the sensitivity of the control valve for the gas stream is retained and thereby the control of the pressure inside of the gas cooler can be stabilized.

3. A method of recovering unburned combustible waste gas produced by blowing pure oxygen into an oxygen top-blowing converter for refining a molten pig iron, comprising the steps of drawing the gas at the start of the oxygen blowing from the converter at a pressure less than that of the outside atmosphere and drawing outside air into said gas, burning the CO in said gas, and discharging the products of combustion into the outside air, then when the CO content of the waste gas issuing from the converter reaches a predetermined value, forming an inert gas curtain around the gas issuing from the converter to exclude air from the outside atmosphere and drawing the gas from the converter at a positive pressure relative to the outside atmosphere, cooling the waste gas, cleaning it and storing it, and then when the CO content of the waste gas issuing from the converter again drops below the predetermined value, removing said curtain of inert gas from around the mouth of the converter and reducing the pressure at which the gas is drawn off from the converter to below the pressure of the outside atmosphere and again drawing outside air into the waste gas and burning the CO in the waste gas and discharging the products of combustion to the outside atmosphere.

References Cited in the file of this patent

UNITED STATES PATENTS

| 2,831,467 | Guczky | April 22, 1958 |
| 2,954,244 | Austin | Sept. 27, 1960 |

FOREIGN PATENTS

| 872,088 | Great Britain | July 5, 1961 |